United States Patent [19]

D'Aubarede et al.

[11] Patent Number: 6,054,064

[45] Date of Patent: *Apr. 25, 2000

[54] REFRIGERANT OF 1,1-DIFLUOROETHYLENE

[75] Inventors: Bruno D'Aubarede; Dominique Balthasart; Mireille Paulus, all of Brussels; Pierre Barthelemy, Pietrebais, all of Belgium; Holger Koenig, Neustadt, Germany; Dominique Lecroc, Dole; Jean-Pierre Vogel, Tavaux, both of France; Hans Buchwald, Ronnenberg, Germany; Reinhold Doering, Steinfurt, Germany; Joachim Hellmann, Hannover, Germany

[73] Assignees: Solvay (Societe Anonyme), Brussels, Belgium; Solvay Fluor und Derivate GmbH, Hannover, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/765,504

[22] PCT Filed: Jul. 6, 1995

[86] PCT No.: PCT/EP95/02635

§ 371 Date: Jul. 9, 1997

§ 102(e) Date: Jul. 9, 1997

[87] PCT Pub. No.: WO96/01882

PCT Pub. Date: Jan. 25, 1996

[30] Foreign Application Priority Data

Jul. 11, 1994 [BE] Belgium ............................... 9400646
Mar. 30, 1995 [BE] Belgium ............................... 9500284
Mar. 30, 1995 [DE] Germany ........................... 195 11 444

[51] Int. Cl.$^7$ ........................................................ C09K 5/04
[52] U.S. Cl. ................................................ 252/67; 62/114
[58] Field of Search ................................. 252/67; 62/114

[56] References Cited

U.S. PATENT DOCUMENTS 4,482,465 11/1984 Gray ............................................ 252/67
4,647,391 3/1987 Bertocchio et al. ........................ 252/69
4,851,144 7/1989 McGraw et al. ........................... 252/68
5,035,823 7/1991 Tamura et al. ............................. 252/67
5,211,867 5/1993 Shankland et al. ........................ 252/67
5,486,302 1/1996 Short ......................................... 252/68
5,545,772 8/1996 Pennetreau et al. ..................... 570/164

FOREIGN PATENT DOCUMENTS 0498152 8/1992 European Pat. Off. .
0558823 9/1993 European Pat. Off. .
91/13048 9/1991 WIPO .
92/16597 10/1992 WIPO .
93/09199 5/1993 WIPO .

OTHER PUBLICATIONS

Chemical Abstracts, AN 91:175762, Hisazumi et al, "Studies of the synthesis of fluoro resin monomers", Nippon Kagaku Kaishi, no month available 1979.

Chemical Abstracts, AN 97:215314, Zhuravlev et al, "Thermal decomposition of 2,2–difluoropropionyl peroxide in hydrocarbon solvents", Zh. Org. Khim., no month available 1982.

Chemical Abstracts, AN 127:192415, Paulus–Lanckriet et al, "1,1–Difluoroethylene—a useful fluid for the refrigeration industry revisited", Proc.—Int. Congr. Refrig., no month available 1995.

Ullmann's Encyclopedia of Industrial Chemistry, 5th Ed., 1988, vol. B3, Chapter 19, pp. 1–20. No month available.

Peng et al.: "A New Two–Constant Equation of State", Industrial Engineering Chem. Fund., 1976, (15), pp. 59–64. No month available.

Extract from the Proceedings of the 19$^{th}$ International Congress of Refrigeration, The Hague, The Netherlands, Aug. 20–25, 1995, cover page, p. XI, and p. 472 (first page of Paulus–Lanckriet et al. article).

CRC Handbook of Chemistry and Physics, 77th Edition, pp. 6–142 and 6–144, no month available 1997.

*Primary Examiner*—Christine Skane
*Attorney, Agent, or Firm*—Venable, Baetjer, Howard & Civilette, LLP; John W. Schneller; Marina V. Schneller

[57] ABSTRACT

Refrigerants comprising 1,1-difluoroethylene and one or more hydrofluoroalkanes, in particular difluoromethane (R-32), trifluoromethane (R-23), 1,1-difluoroethane (R-152a), 1,1,1-trifluoroethane (R-143a), 1,1,1,2-tetrafluoroethane (R-134a) and/or pentafluoroethane (R-125).

19 Claims, 4 Drawing Sheets

REFRIGERANT OF 1,1-DIFLUOROETHYLENE

FIELD OF THE INVENTION

The present invention relates to refrigerants, to refrigerant compositions containing these refrigerants, and to the use of these refrigerants in heat transfer equipment, in particular in mechanical refrigeration systems.

TECHNOLOGY REVIEW

The invention relates in particular to refrigerants referred to as the "medium and low temperature" type, that is to say refrigerants making it possible to achieve temperatures of between about −25° C. and −50° C., which can be used in all fields of medium and low temperature refrigeration such as, in particular, commercial refrigeration, refrigerated transport, air conditioning and various industrial processes, as well as refrigerants referred to as the "very-low temperature" type, that is to say refrigerants making it possible to achieve temperatures of between about −50° C. and −100° C.

In mechanical refrigeration systems, the evaporation of a liquid refrigerant at low pressure causes heat to be removed from the medium surrounding the evaporator. The gas resulting from the evaporation is then compressed and sent to a condenser where it condenses, giving up the heat to the medium surrounding the condenser. Finally, the condensate is returned to the evaporator through a pressure-relief valve. Systems of this type are described in Ullmann's Encyclopedia of Industrial Chemistry, 5th Ed., 1988, vol. B3, chapter 19, pages 1 to 20.

Chlorodifluoromethane (R-22) or the azeotrope of R-22 with chloropentafluoroethane (R-115), referred to as R-502, are conventionally used in mechanical refrigeration systems of the "medium and low temperature" type. Chlorotrifluoromethane (R-13), bromotrifluoromethane (R-13B1) or the azeotrope of R-13 with trifluoromethane (R-23), referred to as R-503, are conventionally used in "very-low temperature" mechanical refrigeration systems. Chlorofluorocarbons, such as R-13 and R-115, bromofluorocarbons, such as R-13B1, and hydrochlorofluorocarbons, such as R-22, have for a number of years been suspected of having detrimental effects on the stratospheric ozone layer. Various international agreements stipulate the progressive reduction, or even complete cessation, of their manufacture and their use. Further to the possibility of destroying ozone, it has been suggested that significant concentrations of halogenated refrigerants in the atmosphere could contribute to the atmospheric warming phenomenon (this phenomenon is referred to as the greenhouse effect). It is therefore desirable to replace existing refrigerants by substitute refrigerants, which do not contain chlorine, thereby having zero ozone depletion potential (ODP), and which preferably have a relatively short lifetime in the atmosphere, thereby having a low global warming potential (HGWP).

Further to having minimal environmental impact, a substitute refrigerant should preferably be non-toxic, non-inflammable, chemically stable and non-corrosive. Furthermore, it should have suitable physical and thermodynamic properties, ideally making it possible to obtain similar efficiency, refrigeration capacity, compressor discharge temperature and compression ratio to those of the refrigerant which it replaces, as well as, if possible, a higher pressure in the evaporator than atmospheric pressure, in order to prevent any moisture from entering the refrigeration system.

Certain refrigerants which do not destroy the stratospheric ozone layer have already been proposed as a replacement for R-22 or R-502. In particular, U.S. Pat. No. 5,035,823 has proposed a refrigerant consisting of 1,1,1-trifluoroethane (R-143a) and 1,1,1,2-tetrafluoroethane (R-134a); patent application WO 92/19199 has proposed a refrigerant consisting of difluoromethane (R-32) and R-134a; patent application WO 92/16597 has proposed a refrigerant consisting of trifluoromethane (R-23), R-32 and R-134; and U.S. Pat. No. 5,211,867 has proposed a refrigerant consisting of 1,1,1-trifluoroethane (R-143a) and pentafluoroethane (R-125). However, these refrigerants have some drawbacks, including a refrigerating capacity which is generally less than that of R-22 and/or a relatively high HGWP.

SUMMARY OF THE INVENTION

The object of the present invention is to provide refrigerants which have little or no effect on the environment and which have thermodynamic properties similar to those of R-22 or R-502, allowing them to be used in existing medium and low temperature refrigeration machines.

A further object of the invention is to provide refrigerants which have little or no effect on the environment and which have thermodynamic properties similar to those of R-13, R-13B1 or R-503, allowing them to be used in existing very-low temperature refrigeration machines.

To this end, the present invention relates to refrigerants which essentially consist of 1,1-difluoroethylene (VF2) and at least one hydrofluoroalkane of formula $C_aH_bF_c$, with a an integer equal to 1 or 2, b an integer from 1 to 4 and c an integer from 2 to 5, the sum of b and c being equal to 2a+2.

BRIEF DESCRIPTION OF THE DRAWINGS

Key for the Figures

FIG. 1 azeotrope (VF2% by weight).

FIG. 2 1.0 bar, 2.0 bar, 5.0 bar, 5.0 bar, 10.0 bar (VF2% by weight).

FIG. 3 1.0 bar, 2.0 bar, 5.0 bar, 7.0 bar, 10.0 bar (VF2% by weight).

FIG. 4 0.5 bar, 1.0 bar, 2.0 bar, 5.0 bar, 10.0 bar (VF2% by weight).

DETAILED DESCRIPTION OF THE INVENTION

The hydrofluoroalkane in the refrigerants according to the invention is preferably selected from trifluoromethane (R-23), difluoromethane (R32), 1,1-difluoroethane (R-152a), 1,1,1-trifluoroethane (R-143a), 1,1,1,2-tetrafluoroethane (R-134a), pentafluoroethane (R-125) and mixtures thereof.

The refrigerants according to the invention may contain from 0.1 to 99.9% by weight of VF2 and from 99.9 to 0.1% of hydrofluoroalkane(s). They usually contain at least 1% by weight of VF2. They generally contain at least 1.5% by weight thereof. They preferably contain at least 2% by weight thereof. The refrigerants according to the invention usually contain at most 99% by weight of VF2. They generally contain at most 90% by weight thereof. They preferably contain at most 80% by weight thereof. It is particularly preferable for them to contain at most 70% by weight thereof.

By appropriate selection of the hydrofluoroalkane and the proportions of their constituents, the refrigerants according to the invention may be suitable for use in machines of the medium and low temperature type, or in machines of the very-low temperature type, as they are defined above.

Those refrigerants according to the invention which are adapted for use in existing medium and low temperature refrigeration machines, hereafter referred to as refrigerants of the medium and low temperature type, preferably contain at least one hydrofluoroalkane selected from difluoromethane (R-32), 1,1-difluoroethane (R-152a), 1,1,1-trifluoroethane (R-143a), 1,1,1,2-tetrafluoroethane (R-134a) and pentafluoroethane (R-125).

Refrigerants according to the invention of the medium and low temperature type usually contain at least 1% by weight of VF2. They generally contain at least 1.5% by weight thereof. They preferably contain at least 2% by weight thereof. The refrigerants according to the invention of medium and low temperature type usually contain at most 40% by weight of VF2. They generally contain at most 35% by weight thereof. They preferably contain at most 30% by weight thereof. It is particularly preferable for them to contain at most 25% by weight thereof.

Refrigerants according to the invention, of the medium and low temperature type, which have given good results essentially consist of from 65 to 99% by weight of hydrofluoroalkane(s) and from 1 to 35% by weight of VF2. Most often, they essentially consist of from 70 to 98% by weight of hydrofluoroalkane(s) and from 2 to 30% by weight of VF2. These refrigerants of medium and low temperature type essentially consist of from 75 to 97.5% by weight of hydrofluoroalkane(s) and from 2.5 and 25% by weight of VF2. The refrigerants of medium and low temperature type which are more particularly preferred consist essentially of from 80 to 97.5% by weight of hydrofluoroalkane(s) and 2.5 to 20% by weight of VF2.

In a first, preferred embodiment of the refrigerants of medium and low temperature type of the invention, the refrigerants of medium and low temperature type essentially consist of
 (a) 1,1-difluoroethylene (VF2);
 (b) 1,1,1,2-tetrafluoroethane (R-134a) and/or pentafluoroethane (R-125); and optionally
 (c) difluoromethane (R-32), 1,1,1-trifluoroethane (R-143a) and/or 1,1-difluoroethane (R-152a).

Of these, the refrigerants containing R-134a are particularly preferred. The ternary refrigerants, of medium and low temperature type, VF2/R-134a/R-32 are more particularly preferred.

Further to VF2 in the quantities given above, the refrigerants of the first embodiment of the refrigerants of medium and low temperature type of the invention generally contain at least 15% by weight of R-134a and/or R-125. They preferably contain at least 20% by weight thereof. It is particularly preferable for them to contain at least 25% by weight thereof. The refrigerants of the first embodiment of the refrigerants of medium and low temperature type of the invention usually contain at most 99% by weight of R-134a and/or R-125. They generally comprise at most 98.5% by weight thereof. They preferably comprise at most 98% by weight thereof. Advantageously, the refrigerants of the first embodiment of the refrigerants of medium and low temperature type of the invention contain R-134a and/or R-125 in a quantity such that the refrigerants are non-flammable.

The refrigerants of the first embodiment of the refrigerants of medium and low temperature type of the invention may furthermore contain R-32, R-143a and/or R-152a. They usually contain at most 80% by weight thereof. They generally comprise at most 75% by weight thereof. They preferably comprise at most 70% by weight thereof.

In a second embodiment of the refrigerants of medium and low temperature type of the invention, the refrigerants of medium and low temperature type essentially consist of
 (a) 1,1-difluoroethylene (VF2);
 (b) 1,1-difluoroethane (R-152a); and
 (c) difluoromethane (R-32) and/or 1,1,1-trifluoroethane (R-143a).

Further to VF2 in the quantities given above, the refrigerants of the second embodiment of the refrigerants of medium and low temperature type of the invention generally contain at least 35% by weight of R-152a. They preferably comprise of at least 40% by weight thereof. It is particularly preferable for them to contain at least 50% by weight thereof. The refrigerants of the second embodiment of the refrigerants of medium and low temperature type of the invention usually comprise at most 85% by weight of R-152a. They generally comprise at most 80% by weight thereof. They preferably comprise at most 75% by weight thereof. The remainder of the refrigerants of the second embodiment of the refrigerants of medium and low temperature type of the invention consists of R-32 and/or R-143a.

The refrigerants according to the invention, of medium and low temperature type, find an application in the techniques of producing cooling or heating, such as refrigeration machines and heat pumps of the compression type. They may in particular replace R-22 or R-502 in their usual applications. The refrigerants according to the invention, of medium and low temperature type, are more particularly suitable for applications which currently employ R-22. The working conditions for the refrigerants according to the invention, of medium and low temperature type, are similar to those for R-22 or R-502, which allows them to be used in compressors which currently employ R-22 or R-502, substantially without modifications.

All other things being equal, the presence of VF2 in the refrigerants according to the invention, of medium and low temperature type, leads, under the working conditions for R-22, to an increase in the refrigeration capacity and the pressure in the evaporator. Furthermore, because of the very low HGWP of VF2 (about 0.004), its presence in the refrigerants according to the invention gives them a low HGWP.

Moreover, the use of the refrigerants according to the invention, of medium and low temperature type, leads to a temperature at the end of compression which is lower than that obtained with R-22.

Those refrigerants according to the invention which are adapted for use in existing very-low temperature refrigeration machines, hereafter referred to as refrigerants of the very-low temperature type, preferably contain at least one hydrofluoroalkane selected from trifluoromethane (R-23), difluoromethane (R-32), 1,1,1-trifluoroethane (R-143a) and pentafluoroethane (R-125). Particularly preferred refrigerants of the very-low temperature type contain at least one hydrofluoroalkane chosen from trifluoromethane (R-23), difluoromethane (R-32) and pentafluoroethane (R-125).

The refrigerants according to the invention, of very-low temperature type, usually contain at least 1% by weight of VF2. They generally contain at least 5% by weight thereof. They preferably contain at least 10% by weight thereof. The refrigerants according to the invention, of very-low temperature type, usually contain at most 99% by weight of VF2. They generally contain at most 90% by weight thereof. They preferably contain at most 80% by weight thereof. It is particularly preferable for them to contain at most 70% by weight thereof.

Refrigerants according to the invention, of very-low temperature type, which have given good results essentially consist of from 10 to 95% by weight of hydrofluoroalkane(s) and from 5 to 90% by weight of VF2. Most often, they essentially consist of from 20 to 90% by weight of hydrofluoroalkane(s) and from 10 to 80% by weight of VF2. More particularly preferred refrigerants of very-low temperature type essentially consist of from 30 to 75% by weight of hydrofluoroalkane(s) and from 25 to 70% by weight of VF2.

In a first embodiment of the refrigerants of very-low temperature type of the invention, the refrigerants of very-low temperature type essentially consist of (a) 1,1-difluoroethylene (VF2); and (b) difluoromethane (R-32), 1,1,1-trifluoroethane (R-143a) and/or pentafluoroethane (R-125).

Of these, the refrigerants containing R-32 and/or R-125 are preferred. The refrigerants of very-low temperature type VF2/R-125 and VF2/R-32/R-125 are particularly preferred.

In a second, preferred embodiment of the refrigerants of very-low temperature type of the invention, the refrigerants of very-low temperature type essentially consist of (a) 1,1-difluoroethylene (VF2);

(b) trifluoromethane (R-23); and optionally (c) difluoromethane (R-32), 1,1,1-trifluoroethane (R-143a) and/or pentafluoroethane (R-125).

Of these, the binary refrigerants VF2/R-23 are particularly preferred.

Further to VF2 in the quantities given above, the refrigerants of the second embodiment of the refrigerants of very-low temperature type of the invention generally contain at least 1% by weight of R-23. They preferably comprise at least 5% by weight thereof. It is particularly preferable for them to contain at least 10% by weight thereof. It is more particularly preferable for them to contain at least 20% by weight thereof. The refrigerants of the second embodiment of the refrigerants of very-low temperature type of the invention usually comprise at most 99% by weight of R-23. They generally comprise at most 95% by weight thereof. They preferably comprise at most 90% by weight thereof. It is particularly preferable for them to contain at most 80% by weight thereof.

The refrigerants of the second embodiment of the refrigerants of very-low temperature type of the invention may furthermore contain R-32, R-143a and/or R-125. They usually contain at most 80% by weight thereof. They generally comprise at most 70% by weight thereof. They preferably comprise at most 60% by weight thereof. It is particularly preferable for them to comprise at most 50% by weight thereof.

Of the refrigerants of the second embodiment of the refrigerants of very-low temperature type of the invention, the more particularly preferred refrigerants are those which contain VF2 and R-23 in proportions in which they form an azeotrope or a pseudo-azeotrope.

Basically, the thermodynamic state of a fluid is defined by four independent variables: pressure (P), temperature (T), the composition of the liquid phase (X) and the composition of the gas phase (Y). An azeotrope is a particular system, with at least two components, for which, at a given temperature and a given pressure, X is equal to Y. A pseudo-azeotrope is a system, with at least two components, for which, at a given temperature and a given pressure, X is substantially equal to Y. In practice, a pseudo-azeotrope behaves almost like a true azeotrope as regards the tendency not to fractionate during boiling or evaporation. Its composition therefore remains substantially constant during phase changes in the refrigeration cycle, and also in the event of refrigerant leaking from the refrigeration system. For the purposes of the present invention, the term pseudo-azeotrope will be used to denote a mixture of at least two constituents, the boiling point of which, at a given pressure, differs from the boiling point of the azeotrope by a maximum of 3° C., preferably by a maximum of 1° C.

The binary refrigerants VF2/R-23 containing from 0.1 to 99.9% by weight of VF2 and from 99.9 to 0.1% by weight of R-23 are pseudo-azeotropes. Those containing from 1 to 90% by weight of VF2 and from 99 to 10% by weight of R-23 are preferred. Those containing from 5 to 80% by weight of VF2 and from 95 to 20% by weight of R-23 are particularly preferred. Those containing from 10 to 70% by weight of VF2 and from 90 to 30% by weight of R-23 are more particularly preferred. The most particularly preferred pseudo-azeotropic binary refrigerants VF2/R-23 contain about from 35 to 60% by weight of VF2 and from 65 to 40% by weight of R-23. The azeotropic VF2 and R-23 composition varies, within this preferred range, as a function of pressure (see FIG. 1, dashed line).

The refrigerants according to the invention, of very-low temperature type, make it possible to achieve temperatures from −50° C. to about −100° C. They are particularly well-suited for achieving temperatures ranging about from −50 to −90° C. They may therefore be used as refrigerants in very-low temperature refrigeration systems, in particular for very-low temperature refrigerators, for refrigeration chambers for quick-freezing foodstuffs, for refrigeration chambers of scientific laboratories and for large industrial refrigeration plants, in particular as a replacement for R-13, R-13B1 or R-503.

The refrigerants according to the invention are generally used in refrigerant compositions which comprise, in addition to the refrigerant, one or more additives used conventionally in refrigerant compositions, such as stabilizers or lubricants, the exact nature of which depends mainly on the intended use of the composition.

The invention therefore also relates to a refrigerant composition comprising a refrigerant, according to the invention, as defined above, and at least one additive.

In the refrigerant composition according to the invention, the additives must be compatible with the constituents of the refrigerant. In particular, they must be chemically inert with respect to the constituents of the refrigerant at the normal working temperatures for the composition according to the invention. The nature of the additives and their proportion in the composition must moreover be chosen so that they do not significantly affect the vaporization temperature of the refrigerant. In particular, the additives may be selected from lubricants, hydrofluoroalkanes and 1,1-difluoroethylene stabilizers, VF2 polymerization inhibitors and corrosion inhibitors. Their proportion by weight (the sum of all the additives) does not generally exceed 50% of the overall mass of the composition, and preferably does not exceed 25%. In practice, proportions of 0.1 to 20% by weight are recommended. The proportion of the additives is expressed as % by weight of the total mass of the refrigerant composition. As a variant, the refrigerant composition may comprise one or more refrigerant compounds other than the constituents of the refrigerants described above, in particular propane (R-290).

The invention also relates to the use of the refrigerants and of the refrigerant compositions according to the invention in all types of heat transfer equipment operating using compression. They may be used to produce cooling by a method involving the condensation of the refrigerant and its subsequent evaporation in a heat exchanger in contact with a body to be refrigerated. They may also be used to produce heating by a method involving evaporation of the refrigerant and its subsequent condensation in a heat exchanger in contact with a body to be heated.

The invention is illustrated by FIGS. 1 to 4 and by the following Examples 1 to 5.

Figure 1:
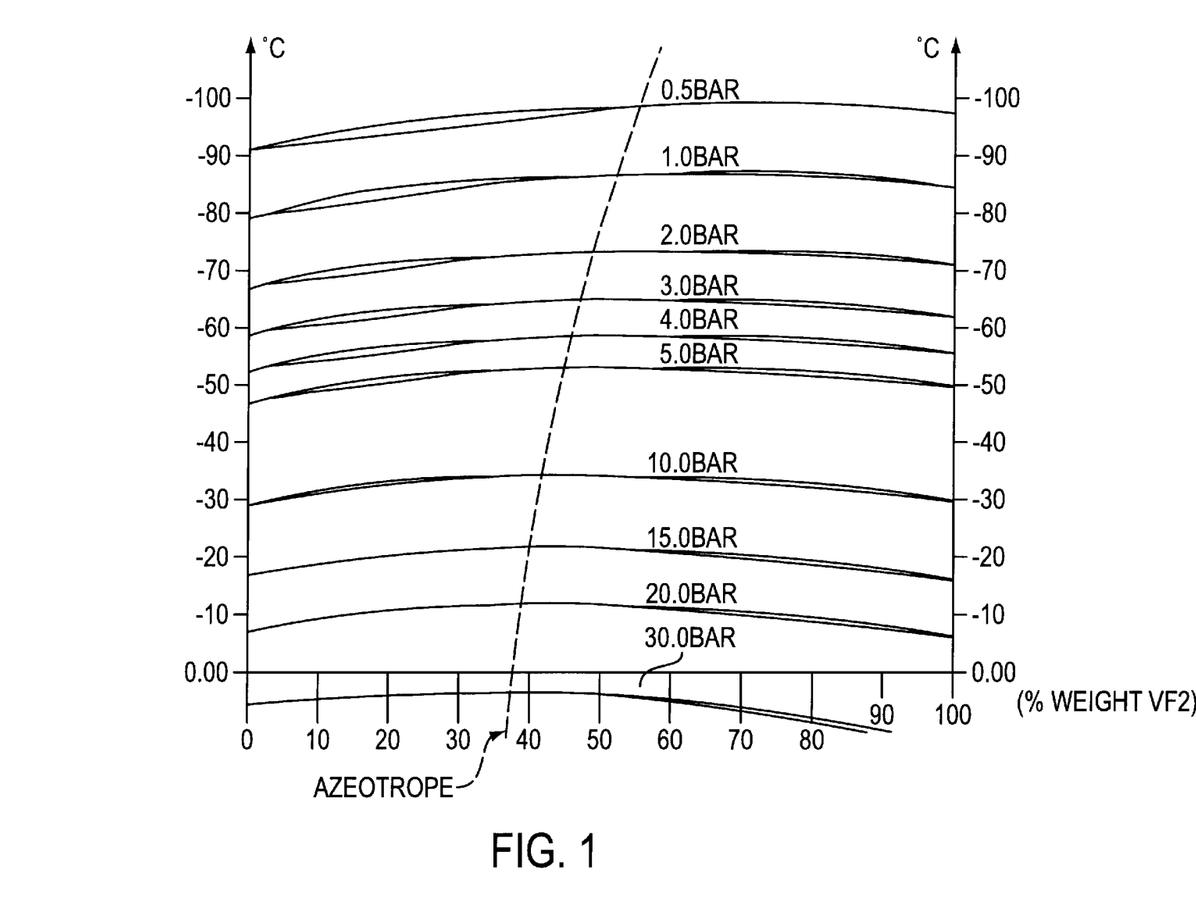
FIG. 1 presents the curves of boiling temperature and dew temperature of the binary VF2 and R-23 compositions at various pressures, as a function of the percentage by weight of VF2 in the composition. The change in the azeotropic composition as a function of pressure is given by the dashed curve.

FIG. 1 presents the curves of boiling temperature and dew temperature of the binary VF2 and R-23 compositions at various pressures, as a function of the percentage by weight of VF2 in the composition. The change in the azeotropic composition as a function of pressure is given by the dashed curve.

Figure 2:
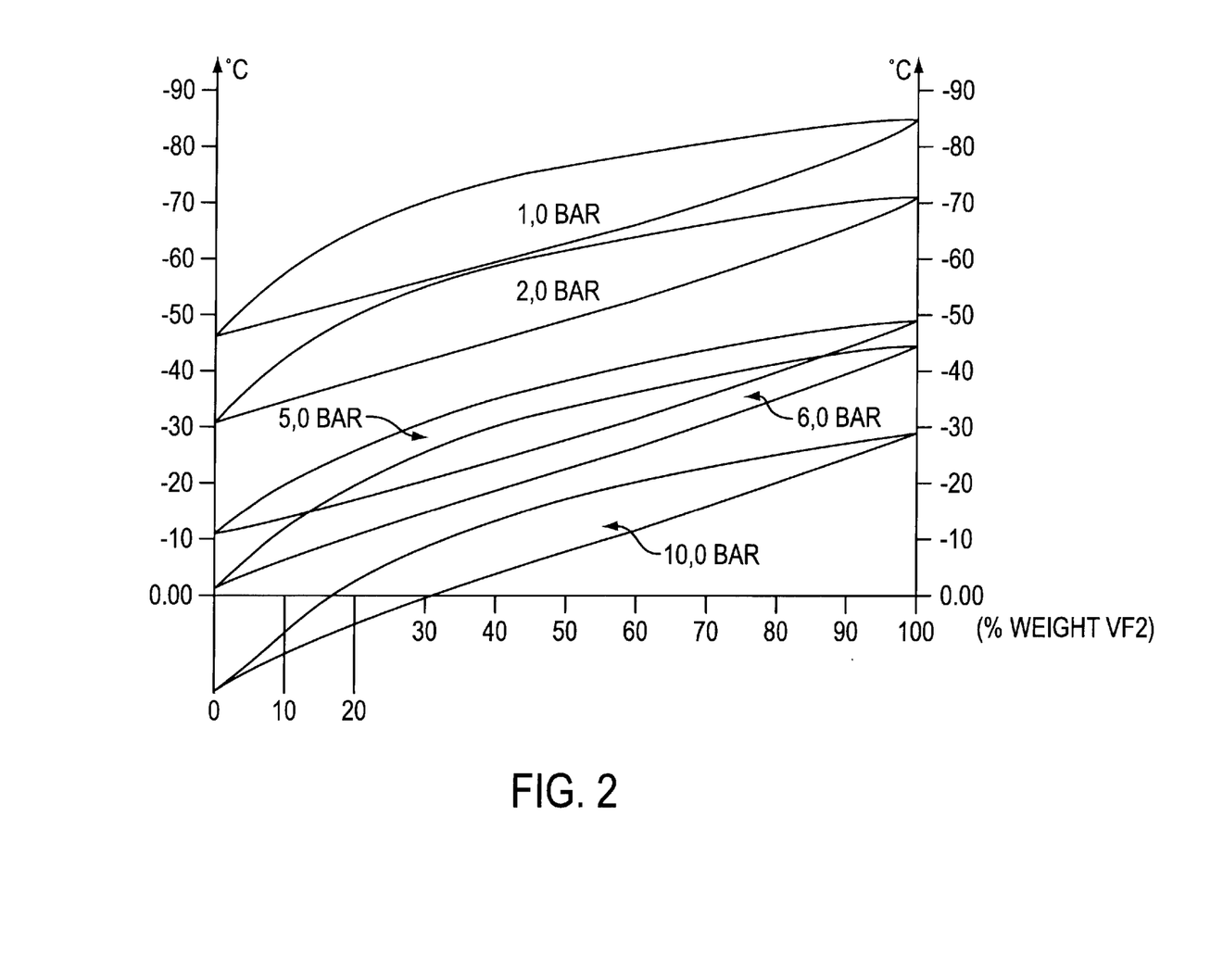
FIG. 2 presents the curves of boiling temperature and dew temperature of the binary VF2 and R-125 compositions at various pressures, as a function of the percentage by weight of VF2 in the composition.

FIG. 2 presents the curves of boiling temperature and dew temperature of the binary VF2 and R-125 compositions at various pressures, as a function of the percentage by weight of VF2 in the composition.

Figure 3:
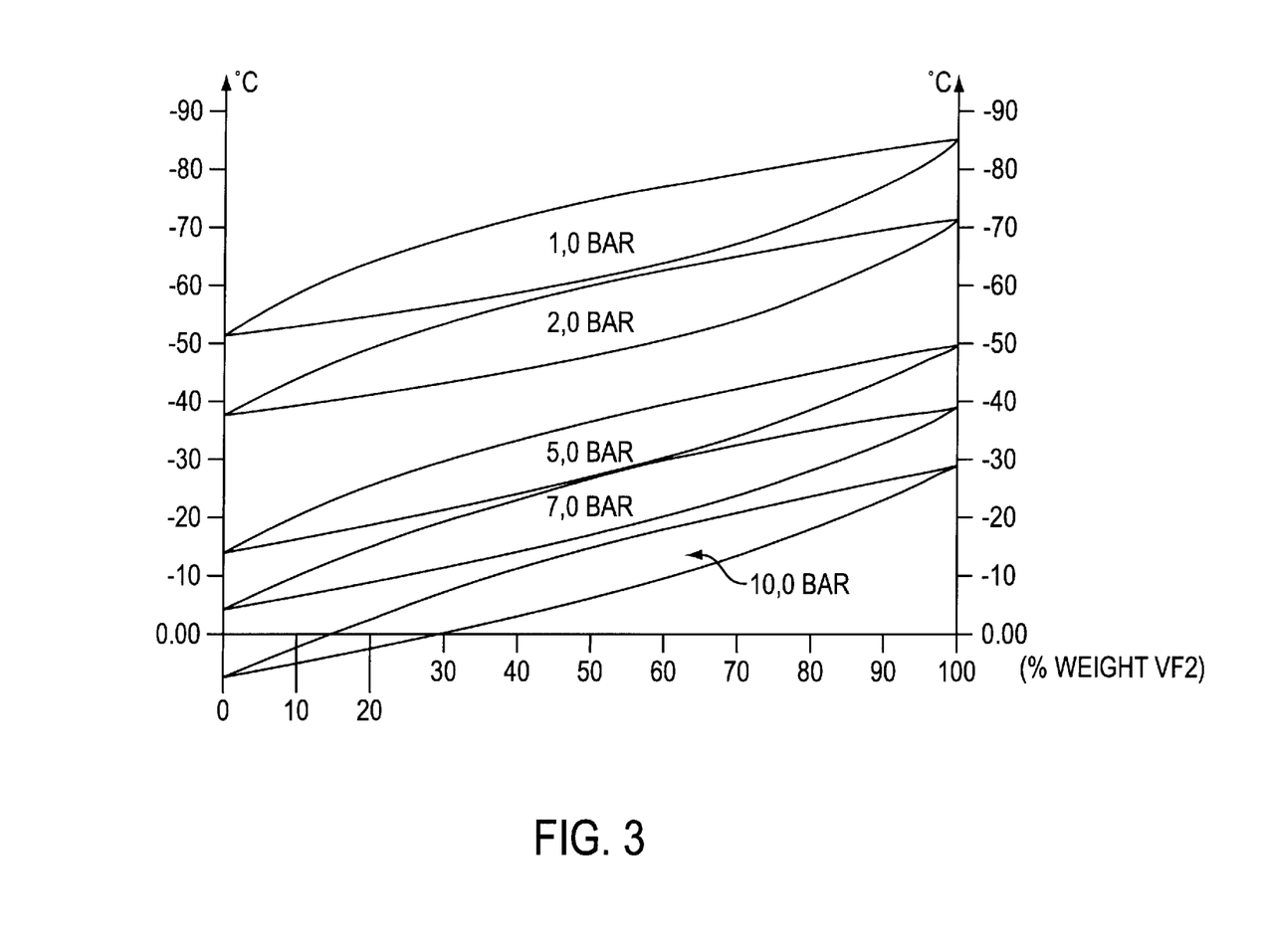
FIG. 3 presents the curves of boiling temperature and dew temperature of the binary VF2 and R-32 compositions at various pressures, as a function of the percentage by weight of VF2 in the composition.

FIG. 3 presents the curves of boiling temperature and dew temperature of the binary VF2 and R-32 compositions at various pressures, as a function of the percentage by weight of VF2 in the composition.

Figure 4:
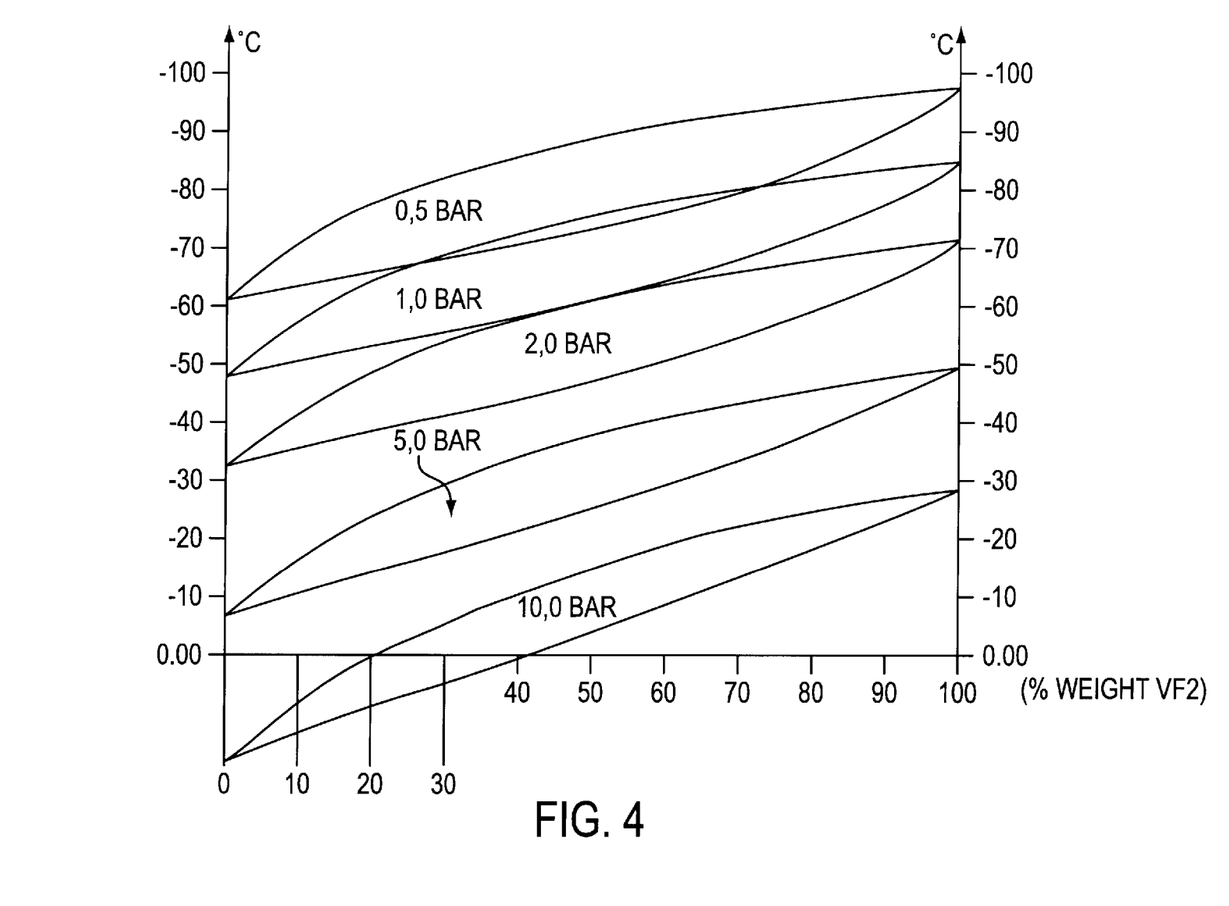
FIG. 4 presents the curves of boiling temperature and dew temperature of the binary VF2 and R-143a compositions at various pressures, as a function of the percentage by weight of VF2 in the composition.

FIG. 4 presents the curves of boiling temperature and dew temperature of the binary VF2 and R-143a compositions at various pressures, as a function of the percentage by weight of VF2 in the composition.

EXAMPLES

Example 1

Using the Peng-Robinson state equation described in Industrial Engineering Chem. Fund. 1976, (15), p. 59, a thermodynamic performance analysis was carried out for several refrigerants according to the invention, of medium and low temperature type. By way of comparison, the same analysis was performed for R-134a alone, for R-22 and for various known refrigerant mixtures consisting of hydrofluoroalkanes.

The parameters of the refrigeration cycle are characteristic of the use of R-22 as refrigeration fluid. The parameters chosen are a temperature at the start of evaporation ($T_{evap}$) of $-30°$ C., a temperature at the end of condensation ($T_{cond}$) fixed at $30°$ C., superheating fixed at 10 K (temperature difference of $10°$ C.), subcooling fixed at 5 K (temperature difference of $5°$ C.) and an isentropic efficiency of the compressor fixed at 0.8.

The temperature at the end of compression ($T_{max}$), the pressure in the evaporator ($P_{ev}$), the compression ratio (R=pressure at the condenser/pressure at the evaporator), the mechanical coefficient of performance (COP) and the volume swept by the compressor (Vol) required to obtain a refrigeration power of 10 kW, were estimated.

The value of the temperature at the end of compression is useful for assessing the feasibility of using the refrigerating fluid, it being possible for an excessively high temperature to lead to degradation of the oil and/or refrigerant which are used, as well as the structural materials of the refrigeration system.

The evaporation pressure should preferably be greater than atmospheric pressure, in order to prevent moisture from entering the refrigeration system.

The mechanical coefficient of performance is a measure which represents the relative thermodynamic efficiency of a refrigerant in a specific refrigeration cycle. This term is the ratio of the useful refrigeration power to the mechanical energy consumed by the compressor.

The volume swept at the compressor reflects the refrigeration capacity of the refrigerant. The lower the volume of refrigerant necessary for obtaining a given refrigerating power, the greater its volumetric capacity.

The results are collated in Table I.

Table I shows that the working conditions for refrigerants according to the invention, of medium and low temperature type, appear to be sufficiently close to those of R-22 to allow them to be used in compressors currently employing R-22.

In particular, VF2/R-134a binary refrigerants constitute a good compromise between the various performance criteria required for replacing R-22 or R-502, and environmental protection criteria. Indeed, R-134a and 1,1-difluoroethylene do not contain chlorine and therefore have an ODP equal to zero. Furthermore, these binary refrigerants have an HGWP which is less than that of R-134a and very much less than other prior art refrigerants which contain R-23, R-143a or R-125. Although test 2 shows the drawback of using R-134a in a refrigerating cycle operating with a temperature at the start of evaporation of $-30°$ C., because of its insufficient vapour pressure which leads to the pressure in the evaporator being less than atmospheric pressure, test 3 shows that a VF2 proportion of 5% by weight is sufficient, under the conditions examined, to achieve a greater pressure in the evaporator than atmospheric pressure. Furthermore, increasing quantities of VF2 make it possible to enhance the refrigeration capacity, a refrigeration capacity identical to that of R-22 being achieved when the VF2 proportion is 20% by weight (tests 4 and 5).

Moreover, analysing Table I shows that, in a given refrigeration cycle, in comparison with known refrigerant mixtures consisting of two hydrofluoroalkanes, ternary refrigerants according to the invention, of medium and low temperature type, consisting of the same two hydrofluoroalkanes and VF2, lead to improved refrigeration capacity and pressure in the evaporator, without significantly affecting the other characteristic parameters of the refrigeration cycle.

Furthermore, comparing tests 11 and 12 shows that it is possible to replace the R-23 contained in refrigerants of medium and low temperature type by VF2, which has an HGWP about 10,000 times less than that of R-23, while retaining comparable refrigeration performance.

TABLE I

| No. | Refrigerant (% by weight) | $T_{max}$ ° C. | $P_{ev}$ R | COP | m³/h | Vol. |
|---|---|---|---|---|---|---|
| 1* | R22 | 92.6 | 1.63 | 7.5 | 2.56 | 31 |
| 2* | R134a | 62.7 | 0.84 | 9.1 | 2.56 | 56 |

TABLE I-continued

| No. | Refrigerant (% by weight) | $T_{max}$ ° C. | $P_{ev}$ R | COP | Vol. m³/h | |
|---|---|---|---|---|---|---|
| 3 | VF2/R134a (5/95) | 72.6 | 1.02 | 10.1 | 2.35 | 48 |
| 4 | VF2/R134a (10/90) | 79 | 1.2 | 10.4 | 2.23 | 41 |
| 5 | VF2/R134a (20/80) | 87 | 1.75 | 9.7 | 2.15 | 31 |
| 6 | VF2/R134a/R125 (2/67/31) | 64.7 | 1.23 | 8.8 | 2.41 | 42 |
| 7 | VF2/R134a/R125 (3.5/66.5/30) | 66.9 | 1.29 | 9.0 | 2.38 | 40 |
| 8 | VF2/R134a/R125 (4/71/25) | 68.2 | 1.26 | 9.2 | 2.36 | 41 |
| 9* | R134a/R32 (70/30) | 87.6 | 1.54 | 8.3 | 2.50 | 32 |
| 10* | R134a/R32 (75/25) | 84.4 | 1.43 | 8.5 | 2.50 | 34 |
| 11* | R23/R134a/R32 (2/67/31) | 90.3 | 1.65 | 8.3 | 2.48 | 30 |
| 12 | VF2/R134a/R32 (2/67/31) | 90.0 | 1.67 | 8.3 | 2.47 | 30 |
| 13 | VF2/R134a/R32 (3.5/66.5/30) | 90.6 | 1.72 | 8.3 | 2.45 | 29 |
| 14 | VF2/R134a/R32 (4/71/25) | 88.2 | 1.63 | 8.5 | 2.44 | 31 |
| 15* | R134a/R143a (70/30) | 64.9 | 1.20 | 8.3 | 2.51 | 42 |
| 16* | R134a/R143a (75/25) | 64.8 | 1.13 | 8.4 | 2.51 | 44 |
| 17 | VF2/R134a/R143a (2/67/31) | 67.7 | 1.30 | 8.4 | 2.45 | 40 |
| 18 | VF2/R134a/R143a (3.5/66.5/30) | 69.5 | 1.36 | 8.5 | 2.41 | 38 |
| 19 | VF2/R134a/R143a (4/71/25) | 70.4 | 1.31 | 8.7 | 2.40 | 39 |
| 20 | VF2/R134a/R290 (5/90/5) | 71.7 | 1.10 | 9.6 | 2.37 | 45 |
| 21 | VF2/R134a/R290 (5/80/15) | 70.2 | 1.23 | 8.7 | 2.41 | 42 |
| 22* | R125/R143a (50/50) | 55.2 | 2.16 | 6.8 | 2.33 | 29 |
| 23 | VF2/R125/R143a (2/50/48) | 56.6 | 2.25 | 6.8 | 2.30 | 28 |
| 24 | VF2/R125/R143a (5/47.5/47.5) | 58.8 | 2.40 | 6.8 | 2.27 | 26 |
| 25 | VF2/R125/R143a (5/50/45) | 58.5 | 2.41 | 6.8 | 2.27 | 26 |
| 26 | VF2/R125/R152a (2/31/67) | 77.0 | 1.09 | 8.7 | 2.51 | 44 |
| 27 | VF2/R125/R152a (3.5/30/66.5) | 78.6 | 1.13 | 8.8 | 2.48 | 43 |
| 28 | VF2/R125/R152a (4/25/71) | 80.2 | 1.10 | 8.9 | 2.49 | 44 |
| 29* | R152a/R143a (70/30) | 77.3 | 1.07 | 8.3 | 2.57 | 45 |
| 30* | R152a/R143a (75/25) | 77.9 | 1.02 | 8.4 | 2.58 | 46 |
| 31 | VF2/R152a/R143a (2/67/31) | 79.1 | 1.15 | 8.3 | 2.53 | 42 |
| 32 | VF2/R152a/R143a (3.5/66.5/30) | 80.6 | 1.19 | 8.4 | 2.50 | 41 |
| 33 | VF2/R152a/R143a (4/71/25) | 81.8 | 1.15 | 8.6 | 2.50 | 42 |

*= Comparative examples

Example 2

A mixture of a VF2/R-134a refrigerant (10/90% by weight) with a polyester-type oil, marketed under the trademark TRITON® SEZ 32 by DEA Mineralöl AG and water was stored at 90° C. in various 300 ml stainless steel cylinders. Some of the cylinders furthermore contained a sample of a molecular sieve (UOP XH9) or a copper or ordinary steel test-piece. The cylinders were kept under these conditions for about one month. No chemical degradation of the refrigerant, no polymerization of the VF2, and no corrosion of the metal test-pieces were observed.

Example 3

A VF2/R-134a refrigerant (5/95% by weight) was tested, according to standard ISO 917, in a refrigeration machine equipped with an open-type compressor, the swept volume of which is 19.6 m³/h, with a water-cooled condenser and with an evaporator in contact with the air. The performance of this refrigerant was compared with that of R-22 in a standard refrigeration cycle. At a mean evaporation temperature of –35.8° C., with the refrigerant according to the invention, in comparison with R-22, a temperature 27.9° C. lower at the end of compression, a 9% higher compression ratio and a 13% lower electrical COP were obtained.

Example 4

The composition of the VF2 and R-23 azeotrope was estimated by measuring the equilibrium composition of the liquid phase (X) and of the vapour phase (Y) for various mixtures of VF2 and R-23, which were kept at constant temperature. The equilibrium pressure was also measured. The results obtained are collated in Table II.

Whereas for low R-23 proportions, the R-23 molar fraction in the gas phase is greater than the R-23 molar fraction in the liquid phase, the opposite is found with high R-23 proportions, demonstrating the existence of an R-23 and VF2 azeotrope.

On the basis of these experimental results, it was estimated, using the Soave-Redlich-Kwong state equation and the Uniquac parameters for the constituents of the mixture, that the composition consisting of 58 mol % of R-23 and 42 mol % of VF2 is azeotropic at a pressure of 15.1 bar, and that this azeotropic composition has a boiling point of –19.5° C. At a pressure of 15.1 bar, the compositions consisting essentially of 30 to 90 mol % of R-23 and 70 to 10 mol % of VF2 have a boiling point of –19±0.5° C.

TABLE II

| Temperature (° C.) | Pressure (bar) | $X_{R-23}$ (mole fr.) | $Y_{R-23}$ (mole fr.) |
|---|---|---|---|
| –15.1 | 15.5 | 0.067 | 0.085 |
| –17.4 | 14.7 | 0.120 | 0.148 |
| –16.4 | 15.8 | 0.279 | 0.314 |
| –18.2 | 16.0 | 0.381 | 0.414 |
| –18.2 | 15.7 | 0.596 | 0.602 |
| –18.0 | 15.9 | 0.720 | 0.711 |
| –18.2 | 15.1 | 0.795 | 0.781 |
| –18.2 | 15.4 | 0.883 | 0.868 |

Example 5

An analysis of the thermodynamic performance of several refrigerants according to the invention, of very-low temperature type, was performed in similar fashion to Example 1. By way of comparison with known refrigerants, the same analysis was performed for R-13, R-13B1 and R-503 (R-13 and R-23 mixture in proportions by weight of 59.9/40.1).

The parameters of the refrigeration cycle are characteristic of very-low temperature systems. The parameters kept constant are superheating fixed at 10 K (temperature difference of 10° C.), subcooling fixed at 5 K (temperature difference of 5° C.) and an isentropic efficiency of the compressor fixed at 0.8. The temperatures at the start of evaporation and at the end of compression which were set are given in Table III.

The temperature at the end of compression ($T_{max}$), the pressure in the evaporator ($P_{ev}$), the compression ratio (R=pressure in the condenser/pressure in the evaporator), the mechanical coefficient of performance (COP), the volumetric refrigeration capacity ($q_v$) and the volume swept in the compressor (Vol) required to obtain a refrigeration power of 10 kW were estimated.

The results are collated in Table III.

Table III shows that the working conditions for the refrigerants according to the invention, of very-low temperature type, appear to be sufficiently close to those of R-13, R-13B1 or R-503 to allow them to be used in compressors which currently employ these refrigerants.

TABLE III

| No. | Refrigerant (% by weight) | $T_{evap}$ (°C.) | $T_{cond}$ (°C.) | $T_{max}$ (°C.) | $P_{ev}$ (bar) | R | COP | $q_v$ (kJ/m³) | Vol (m³/h) |
|---|---|---|---|---|---|---|---|---|---|
| 1* | R-503 | −88 | −30 | 40.5 | 1.05 | 11.36 | 1.88 | 724 | 49.7 |
| 2 | VF2/R23 (60/40) | −88 | −30 | 46.0 | 0.98 | 11.53 | 1.91 | 700 | 51.4 |
| 3* | R-13 | −70 | −30 | 7.7 | 1.8 | 4.65 | 3.41 | 1287 | 28.0 |
| 4 | VF2/R-125 (50/50) | −70 | −30 | 17.4 | 0.99 | 5.92 | 3.35 | 816 | 44.1 |
| 5 | VF2/R-32 (50/50) | −70 | −30 | 47.5 | 0.87 | 5.92 | 3.49 | 786 | 45.8 |
| 6* | R=13B1 | −60 | 10 | 58.6 | 0.92 | 12.08 | 1.77 | 579 | 62.2 |
| 7 | VF2/R-125/R-32 (33.3/33.3/33.3) | −60 | 10 | 89.0 | 1.15 | 13.79 | 1.71 | 772 | 46.6 |

*= Comparative examples

What is claimed is:

1. A refrigerant consisting of from 0.1% to 99.9% by weight of 1,1-difluoroethylene and from 99.9% to 0.1% by weight of at least one hydrofluoroalkane of formula $C_aH_bF_c$, with a an integer equal to 1 or 2, b an integer from 1 to 4 and c an integer from 2 to 5, the sum of b and c being equal to 2a+2.

2. The refrigerant according to claim 1, in which the hydrofluoroalkane is selected from the group consisting of difluoromethane, trifluoromethane, 1,1-difluoroethane, 1,1,1-trifluoroethane, 1,1,1,2-tetrafluoroethane, pentafluoroethane and mixtures thereof.

3. The refrigerant according to claim 2, in which the hydrofluoroalkane is selected from the group consisting of difluoromethane, 1,1-difluoroethane, 1,1,1-trifluoroethane, 1,1,1,2-tetrafluoroethane, pentafluoroethane and mixtures thereof.

4. The refrigerant according to claim 3, consisting of
   (a) 1,1-difluoroethylene;
   (b) 1,1,1,2-tetrafluoroethane and/or pentafluorethane; and optionally
   (c) difluoromethane and/or 1,1,1-trifluoroethane and/or 1,1-difluoroethane.

5. The refrigerant according to claim 4, wherein (b) consists of 1,1,1,2-tetrafluoroethane.

6. The refrigerant according to claim 4, wherein (c) consists of difluoromethane.

7. The refrigerant according to claim 3, consisting of:
   (a) 1,1-difluoroethylene;
   (b) 1,1-difluoroethane; and
   (c) difluoromethane and/or 1,1,1-trifluoroethane.

8. The refrigerant according to claim 3, consisting of from 65 to 99% by weight of hydrofluoroalkane and from 1 to 35% by weight of 1,1-difluoroethylene.

9. The refrigerant according to claim 2, in which the hydrofluoroalkane is selected from the group consisting of difluoromethane, trifluoromethane, 1,1,1-trifluoroethane, pentafluoroethane and mixtures thereof.

10. The refrigerant according to claim 9, consisting of
    (a) 1,1-difluoroethylene; and
    (b) difluoromethane and/or 1,1,1-trifluoroethane and/or pentafluoroethane.

11. The refrigerant according to claim 9, consisting of
    (a) 1,1-difluoroethylene;
    (b) trifluoromethane; and optionally
    (c) difluoromethane and/or 1,1,1-trifluoroethane and/or pentafluoroethane.

12. The refrigerant according to claim 11, consisting of 1,1-difluoroethylene and trifluoromethane.

13. The refrigerant according to claim 11, consisting of from 70 to 10% mol 1,1-difluoroethylene and and from 30 to 90% mol trifluoromethane to form an azeotrope or a pseudo-azeotrope which will boil at −19±0.5° C. at a pressure of 15.1 bar.

14. The refrigerant according to claim 9, consisting of from 10 to 95% by weight of hydrofluoroalkane(s) and from 5 to 90% by weight of 1,1-difluoroethylene.

15. A refrigerant composition consisting of a refrigerant according to claim 1 and at least one additive selected from the group consisting of lubricants, VF2 polymerization inhibitors, corrosion inhibitors, and 1,1-difluoroethylene stabilizers.

16. A refrigerant composition according to claim 15, including from 0.1 to 50% by weight of additive.

17. The refrigerant according to claim 12, consisting of from 70 to 10% mol 1,1-difluoroethylene and and from 30 to 90% mol trifluoromethane to form an azeotrope or a pseudo-azeotrope which will boil at −19±0.5° C. at a pressure of 15.1 bar.

18. In a method of operating heat transfer equipment which makes use of compression, the step of utilizing a refrigerant consisting of from 0.1% to 99.9% by weight 1,1-difluoroethylene and from 99.9% to 0.1% by weight of at least one hydrofluoroalkane of formula $C_aH_bF_c$, with a an integer equal to 1 or 2, b an integer from 1 to 4 and c an integer from 2 to 5, the sum of b and c being equal to 2a+2.

19. In a method of operating heat transfer equipment which makes use of compression, the step of utilizing a refrigerant composition consisting of a refrigerant according to claim 1 and at least one additive selected from the group consisting of lubricants, VF2 polymerization inhibitors, corrosion inhibitors, and 1,1-difluoroethylene stabilizers.

* * * * *